US012030061B2

(12) United States Patent
StJohn

(10) Patent No.: US 12,030,061 B2
(45) Date of Patent: Jul. 9, 2024

(54) CONVEYOR SLUICE SYSTEM

(71) Applicant: Matthew StJohn, Denver, CO (US)

(72) Inventor: Matthew StJohn, Denver, CO (US)

(*) Notice: Subject to any disclaimer, the term of this patent is extended or adjusted under 35 U.S.C. 154(b) by 0 days.

(21) Appl. No.: 17/706,238

(22) Filed: Mar. 28, 2022

(65) Prior Publication Data
US 2022/0314232 A1 Oct. 6, 2022

Related U.S. Application Data

(60) Provisional application No. 63/169,468, filed on Apr. 1, 2021.

(51) Int. Cl.
*B03B 5/26* (2006.01)
*B03B 5/34* (2006.01)
*B03B 5/72* (2006.01)
*B03B 9/00* (2006.01)
*B65G 45/22* (2006.01)

(52) U.S. Cl.
CPC ............... *B03B 9/00* (2013.01); *B03B 5/26* (2013.01); *B03B 5/34* (2013.01); *B03B 5/72* (2013.01); *B65G 45/22* (2013.01)

(58) Field of Classification Search
CPC ........ B65G 45/10; B65G 45/22; B65G 15/42; B65G 15/46; B65G 2201/042; B65G 2201/045; B65G 2811/095; B03B 5/26; B03B 9/00
See application file for complete search history.

(56) References Cited

U.S. PATENT DOCUMENTS

| 4,199,441 | A | * | 4/1980 | Ross | B03B 5/26 |
| | | | | | 209/498 |
| 4,251,358 | A | * | 2/1981 | Mozley | B03B 5/04 |
| | | | | | 209/437 |
| 4,451,357 | A | * | 5/1984 | LaVigne | B03C 7/08 |
| | | | | | 209/131 |
| 4,975,182 | A | | 4/1990 | Barefoot | |
| 4,962,858 | A | * | 10/1990 | Newman | B03B 5/26 |
| | | | | | 209/44 |
| 5,287,975 | A | | 2/1994 | Chumley et al. | |
| 5,375,721 | A | * | 12/1994 | LaVigne | B03B 4/04 |
| | | | | | 209/131 |
| 5,896,997 | A | * | 4/1999 | Tanner | C22B 11/00 |
| | | | | | 209/268 |

(Continued)

*Primary Examiner* — Joseph C Rodriguez
(74) *Attorney, Agent, or Firm* — Kenneth Altshuler

(57) ABSTRACT

Described is a conveyor sluice system useful for mining fine particles of target minerals, such as gold, that are difficult to collect and are therefore often discarded. Several conveyor sluice arrangements discussed herein use a textured belt that is wrapped around head and tail pulley rollers. Post hydrocyclone aggregate distributor feeds conveyor sluice slurry onto the textured belt near the head pulley roller. As the conveyor sluice slurry flows down the textured belt surface, concentrated aggregate (rich in target heavy minerals) settles and gets trapped in the belt texture. At least one belt cleaning rinse nozzle aims rinse water at the textured outer surface and sprays the concentrated aggregate out from the belt texture. A concentrate launder collects the rinsed off concentrated aggregate and pumps it to a finishing table where the target minerals are separated and collected.

18 Claims, 10 Drawing Sheets

(56) References Cited

U.S. PATENT DOCUMENTS

| | | | |
|---|---|---|---|
| 5,931,285 A * | 8/1999 | Madsen | G05D 19/02 |
| | | | 198/761 |
| 6,799,681 B1 * | 10/2004 | Warren | B03B 5/26 |
| | | | 209/268 |
| 7,438,188 B2 * | 10/2008 | Stolworthy | B03B 5/04 |
| | | | 209/427 |
| 8,853,584 B2 | 3/2014 | Roos et al. | |
| 9,375,726 B2 * | 6/2016 | Johns | B03C 1/12 |
| 9,682,405 B2 * | 6/2017 | Snyder | B03B 4/04 |
| 10,464,754 B2 | 11/2019 | Miller et al. | |
| 2009/0103942 A1 | 4/2009 | Lamphere et al. | |
| 2011/0186486 A1 | 8/2011 | Alderson et al. | |
| 2016/0001299 A1 * | 1/2016 | Johns | B03B 7/00 |
| | | | 209/39 |
| 2016/0303526 A1 | 10/2016 | Yuan et al. | |
| 2022/0112032 A1 * | 4/2022 | Jensen | B65G 27/32 |

* cited by examiner

CONVEYOR SLUICE SYSTEM

CROSS-REFERENCE TO RELATED APPLICATIONS

This application claims priority to and the benefit of U.S. Provisional Patent Application No. 63/169,468 entitled: CONVEYOR SLUICE SYSTEM, filed on Apr. 1, 2021.

FIELD OF THE INVENTION

The present embodiments are directed to a conveyor sluice system useful for recovering fine particles of target materials from a feed stream of less heavy particles.

DESCRIPTION OF RELATED ART

A water feed stream is a commonly used to mine/separate gold or other target minerals from bulk earth. Bulk earth is generally comprised of precious metals, minerals, bulk rock (primarily composed of silicate-based materials), organic matter, etc. Feed stream mining is considered an effective way to capture target particles (gold/minerals) that are larger than 100 μm. Target particles that are less than 100 μm are generally considered cost prohibitive to recover and are, accordingly, discarded as waste or tailings.

It is to innovations related to this subject matter that the claimed invention is generally directed.

SUMMARY OF THE INVENTION

The present embodiments are generally directed to a conveyor sluice system useful for mining fine target particles (silt) that would otherwise be discarded as tails from a feed stream. As used herein, fine target particles are considered to be particles that are a) smaller than 100 μm when granules (3D grains) or b) potentially larger than 100 μm when the particles are platelet/sheet-like in shape (essentially 2D) that do not easily settle in water.

Some embodiments of the present invention contemplate a method for segregating conveyor sluice slurry using a conveyor sluice that comprises a textured belt wrapped around a head pulley roller and tail pulley roller. The belt defining a textured outer surface that when facing upward (towards the sky) is considered a sky-facing belt surface and when facing downward (towards the ground) is considered a ground-facing belt surface. The conveyor sluice can be positioned at a conveyor sluice angle between −5° and −45° from a horizontal plane. Conveyor sluice slurry can be introduced to the sky-facing belt surface approximately at the head pulley roller (which is more or less at the highest point of the conveyor belt). The sky-facing belt surface can be made to essentially continuously move towards the head pulley roller while continuously flowing the conveyor sluice slurry towards the tail pulley roller. While the sky-facing belt surface is essentially continuously moving towards the head pulley roller, a concentrated aggregate is separated out from the conveyor sluice slurry. The concentrated aggregate settles in grooves in the textured outer surface. While the sky-facing belt surface is essentially continuously moving towards the head pulley roller, the textured outer surface is rotated over the head pulley roller. The concentrated aggregate is then sprayed off the textured belt surface, or more specifically out from the grooves with rinse water at the head pulley roller and/or the ground-facing surface. The rinse water and the sprayed off concentrated aggregate is collected in a concentrate launder where the concentrated aggregate along with the rinse water is pumped from the concentrate launder to a decanting hopper. The concentrated aggregate and at least a portion of the rinse water in the decanting hopper is emptied to a finishing table. This can be a continuous process whereby the finishing table constantly receives concentrated aggregate along with rinse water from the decanting hopper. Accordingly, the decanting hopper constantly receives the concentrated aggregate along with the rinse water from the concentrate launder, which receives a continuous supply of concentrated aggregate from the constantly moving belt.

Yet another embodiment of the present invention contemplates a conveyor sluice arrangement comprising a belt defined by a textured outer surface, wherein the belt is wrapped around (and in tension between) a head pulley roller and a tail pulley roller. At any given time, the textured outer surface comprises a sky-facing portion, a ground-facing portion, an upper in-transition portion or a lower in-transition portion (where the belt cooperates with the pulley rollers). The conveyor sluice defines a sluice length as extending from the head pulley roller to the tail pulley roller. A conveyor sluice width is defined as greater than or equal to a belt width of the belt. The conveyor sluice is at an angle that is between −5° and −45° from a horizontal plane, wherein the conveyor sluice angle is defined by the sky-facing portion between the head pulley roller and the tail pulley roller. The head pulley roller is above the tail pulley roller. A post hydrocyclone aggregate distributor feeds conveyor sluice slurry onto the sky-facing portion within 12 inches of the head pulley roller. At least one belt cleaning rinse nozzle (with rinse water) is directed at the textured outer surface either at the upper in-transition portion at the head pulley roller or at the ground-facing portion. A concentrate launder is located under the ground-facing portion to collect the rinse water containing the fine material (from the conveyor sluice slurry) trapped in the belt grooves/textured outer surface. A concentrate pump is in communication with the concentrate launder and a concentrate hopper to move the rinse water and fine material to the concentrate hopper. A belt motor configured to drive the sky-facing portion only towards the head pulley roller at a velocity, which in certain embodiments is adjustable. Some embodiments contemplate the velocity being between 1-30 feet per minute.

Still other certain embodiments of the present invention contemplate a mineral recovering system comprising a static riffle sluice defined by a riffle sluice leading edge and a riffle sluice trailing edge. The static riffle sluice configured to receive a raw feed slurry from a grizzly hopper. An aggregate screen, disposed downstream from the riffle sluice trailing edge, that essentially permits only screened undersized aggregate from the raw feed slurry to pass to an undersized aggregate collecting tank. A static hydrocyclone is configured to receive the screened undersized aggregate. The mineral recovery system further comprises at least one conveyor sluice having a textured belt that wraps around a head pulley roller and a tail pulley roller, the head pulley roller is positioned higher than the tail pulley roller. The textured belt is configured to rotate with a sky-facing belt portion moving towards the head pulley roller and a ground-facing belt portion moving towards the tail pulley roller. Post hydrocyclone aggregate is received from the static hydrocyclone, which is configured to be distributed on the sky-facing surface of the belt within 12 inches of the head pulley roller. The textured belt is configured to retain a concentrated aggregate. At least one belt cleaning rinse nozzle is directed at the textured belt within 12 inches of the head pulley roller but not directed at the sky-facing belt surface. The belt cleaning rinse nozzle is configured to spray rinse water on the textured belt to liberate the concentrated aggregate from the textured belt. A finishing table is configured to receive the liberated concentrated aggregate and separate fine target material from the concentrated aggregate.

DETAILED DESCRIPTION

Figure 1A:
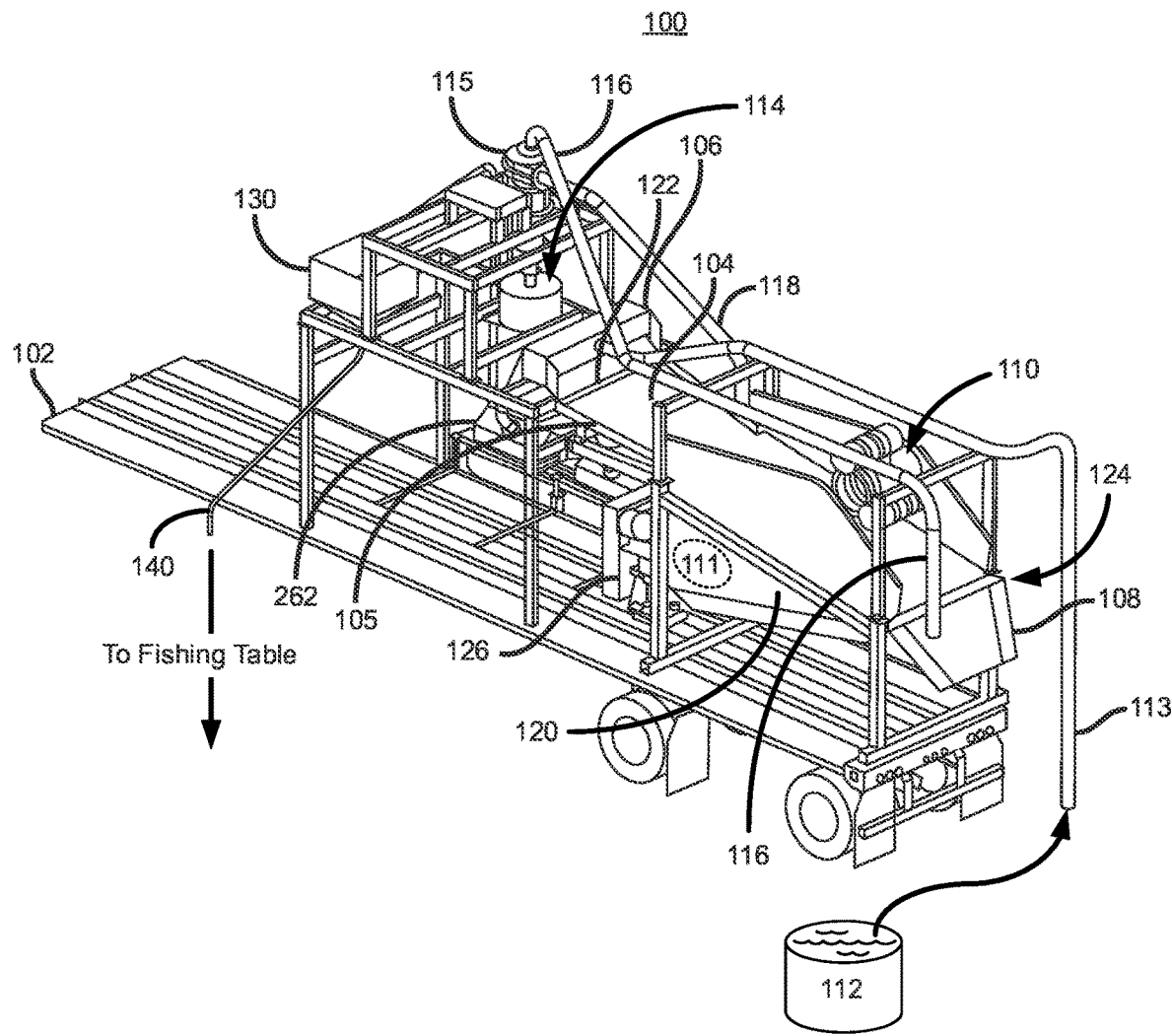
FIGS. 1A and 1B are line drawings of two different sides of a conveyor sluice system in accordance with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving mining. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific+/−value assigned to "essentially", then assume essentially means to be within +/−2.5% of exact. In what follows, similar or identical structures may be identified using identical callouts.

Some embodiments of the present invention are directed to a conveyor sluice system useful for mining fine particles of target materials (e.g., recovering target minerals) that are heavier than silicon and other bulk earth. Bulk earth is generally comprised precious metals, rare or heavy element minerals, bulk rock primarily composed of silicate based molecules, organic matter, etc. Certain aspects of the present invention are directed to mining for gold or other metallic elements or minerals that are heavier than bulk earth using water as a carrier using a conveyor sluice system. Several conveyor sluice embodiments can comprise a belt defined by a textured outer surface wherein the belt is wrapped around a head pulley roller and a tail pulley roller. A post hydrocyclone aggregate distributor feeds conveyor sluice slurry onto the top of the belt near or optionally within 12 inches of the head pulley roller. As the conveyor sluice slurry flows down the belt texture surface, concentrated aggregate (rich in target heavy minerals, such as gold, silver or tin, for example) settles and gets caught in the belt texture. At least one belt cleaning rinse nozzle aims rinse water at the textured outer surface at an in-transition portion of the belt that wraps around the head pulley roller and sprays the concentrated aggregate off the belt surface and out from the texture. A concentrate launder located under the ground-facing portion of the belt collects the rinsed off concentrated aggregate and pumps it to a concentrate hopper. The concentrated aggregate is separated at a finishing table to produce the final heavy mineral sought after. Certain other embodiments envision an apparatus similar to the embodiments shown in the figures below but used for reclaiming precious metals from trash. This is considered urban mining herein.

Figure 1B:
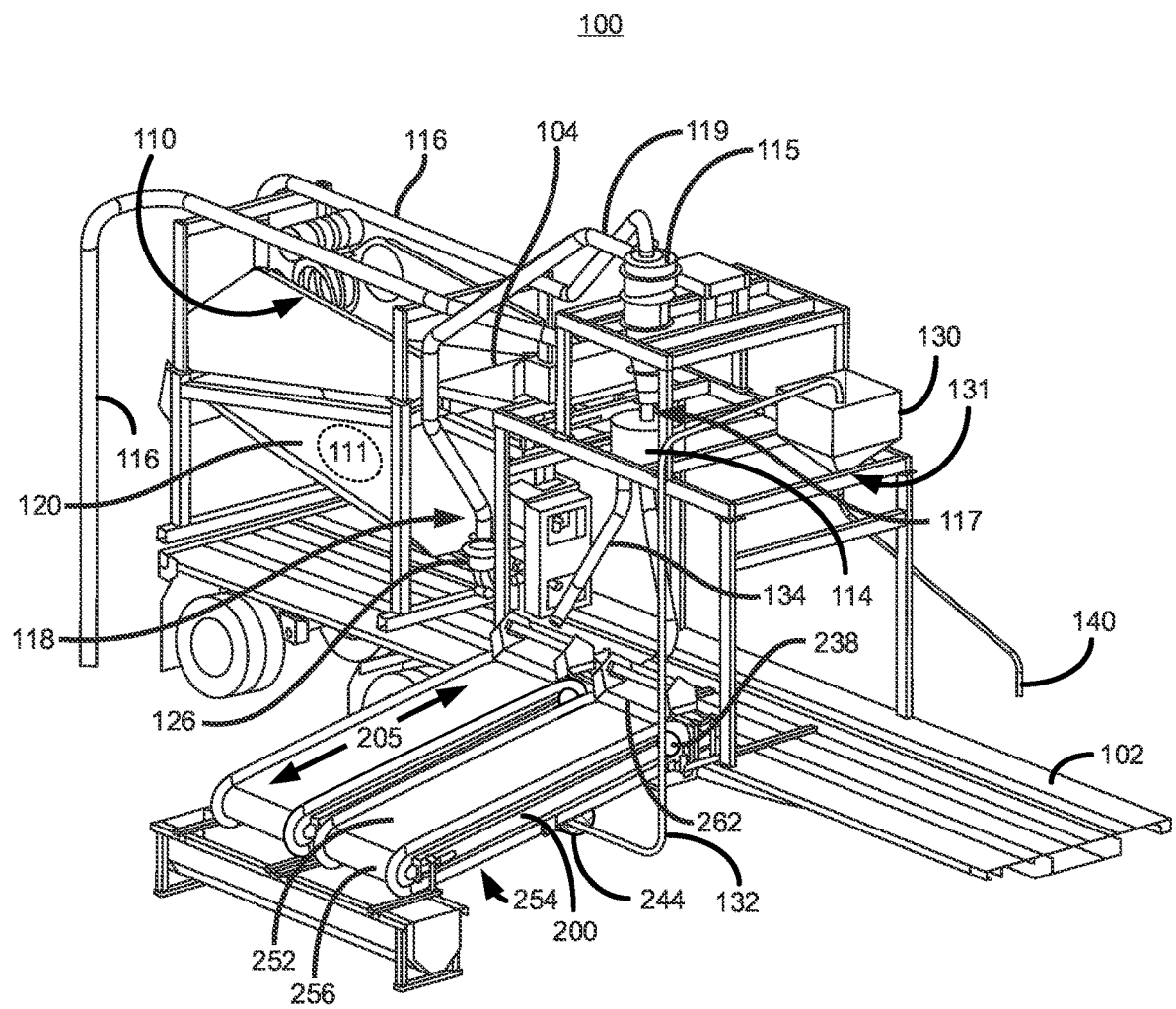

FIGS. 1A and 1B are line drawings of two different sides of a conveyor sluice system 100 in accordance with embodiments of the present invention. In this embodiment, the conveyor sluice system 100 includes the conveyor sluice mining components/elements, discussed below, which are largely supported by a semi-truck trailer 102 for mobility and transportation convenience. Other optional embodiments envision a conveyor sluice system assembled without a semi-truck trailer 102. For purposes of simplicity, the conveyor sluice mining components are generally described in conjunction with FIGS. 1A, 1B and 2 in the order of material processing. Certain aspects of the present invention are especially effective for mining the relatively small percentage of high specific gravity minerals that comprise raw earth, such as gold, silver, tin, etc.

In the present embodiment of FIGS. 1A and 1B, raw feed slurry 112 is pumped to a riffle sluice distributor 106 via a feed slurry pipe 113, such as by way of a grizzly hopper (not shown), for example. Raw feed slurry 112 (or just 'feed slurry') is a mixture of water and sorted raw earth (feed), wherein the sorted raw earth is free of large boulders, large rocks, and other large debris, such as debris greater than 2 inches in diameter. In some embodiments the sorted raw earth is approximately less than ¾ of an inch in diameter. Certain embodiments envision that instead of discarding large rocks, the large rocks are crushed to a diameter that is less than 2 inches, or to some other target diameter, thereby preserving the opportunity to recover minerals encapsulated in the boulders. The feed slurry 112 fans out from the riffle sluice distributor 106 located at a leading edge 122 of a static riffle sluice 105. Because the static riffle sluice 105 is tipped at a static riffle sluice angle that is between −5° and −45° from the horizontal plane 230, the feed slurry 112 flows downhill over the course riffle surface 104. As the feed slurry 112 flows over the course riffle surface 104, heavy mineral nuggets (such as gold) are trapped in the course riffle surface 104. The static riffle sluice angle 235 is considered negative in this arrangement because the riffle sluice leading edge 122 is at an angle higher than the riffle sluice trailing edge 124, hence 'downhill'. Also, the static riffle sluice 105 is considered static because there are essentially no moving parts (not taking into account the flowing feed slurry 112).

An aggregate screen 110, located near or after the riffle sluice trailing edge 124, is used to separate out the oversized aggregate (not shown) from the feed slurry 112. The oversized (course) aggregate passes over the aggregate screen 110 and down the screen oversize shoot 108 where it can be carted away as waste, also known as tailings. The screened feed slurry 111, which is essentially the water and undersized aggregate, is channeled to and retained in an undersized aggregate screen tank 120. The screened feed slurry 111 is depicted with a dashed-line oval around it representing that the screened feed slurry 111 is actually in the tank 120. An undersized aggregate pump 126 pumps the post screened undersized feed slurry (undersized aggregate and water) 111 to a hydrocyclone 115 by way of a hydrocyclone inlet pipe 118. Certain embodiments envision the undersized aggregate being less than ⅛ of an inch in diameter. The mouth of the inlet pipe 119 is positioned tangentially and in-line with a downward ramping channel within/inside of the hydrocyclone 115, which segregates the undersized aggregate (from the screened feed slurry 111) into heavier post hydrocyclone aggregate (not shown). The heavier post hydrocyclone aggregate flows out of the hydrocyclone underflow port 117 into a conveyor-sluice distributor tank 114. Though still a slurry, the heavier post hydrocyclone aggregate comprises less water because the bulk of the water along with the lighter undersized aggregate in the hydrocyclone 115 flows to the top of the hydrocyclone 115 and out the hydrocyclone overflow pipe 116 as tailings. The post hydrocyclone aggregate flows down the conveyor sluice distributor pathway 134, which in this case is a pipe, and onto at least one conveyor sluice 200.

For reference, FIGS. 1A and 1B show elements referenced in details elsewhere, which include a concentrate hopper 130, a finishing table conduit 140, a belt motor 238, the conveyor belt length 205, distributor width 262, sky-facing portion of the belt 252, ground-facing portion of the belt 254 and the belt lower transition 256.

Figure 2:
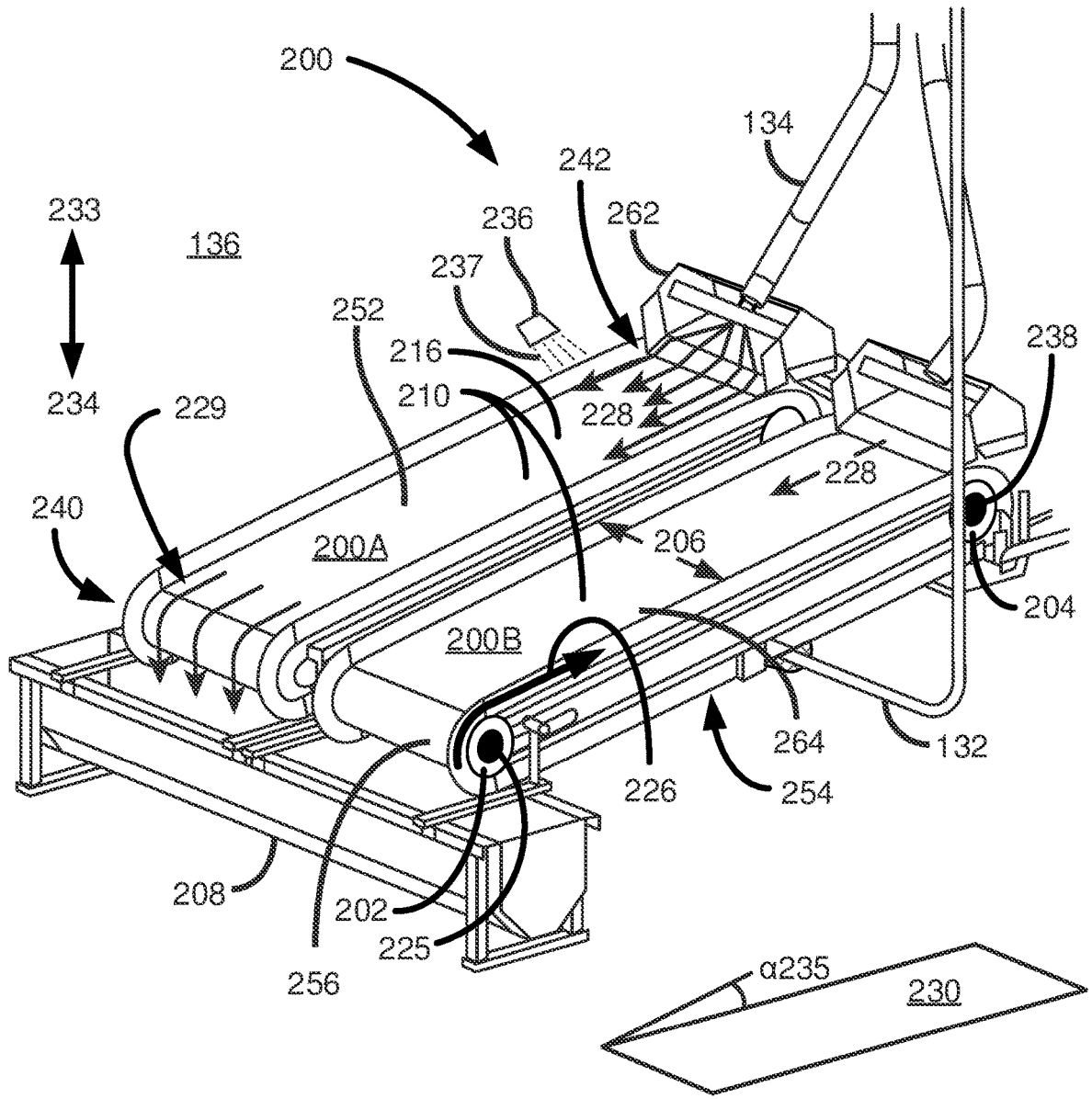
FIG. 2 is a line drawing of a conveyor sluice consistent with embodiments of the present invention.
Figure 3A:
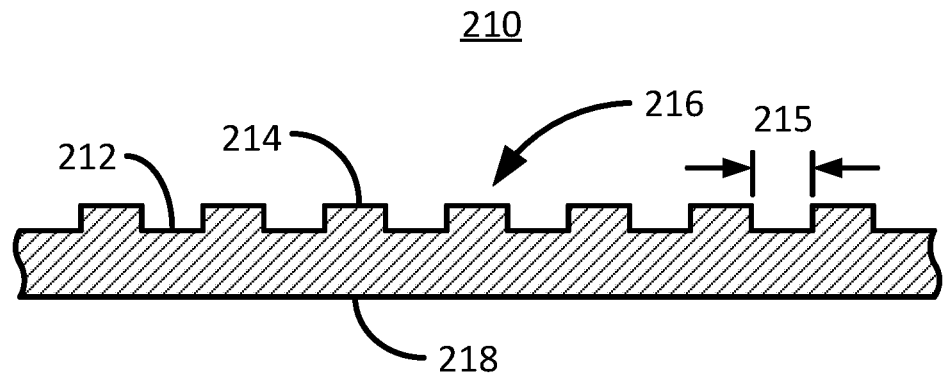
FIGS. 3A-3C are line drawings of several belt embodiments consistent with embodiments of the present invention.
Figure 3B:
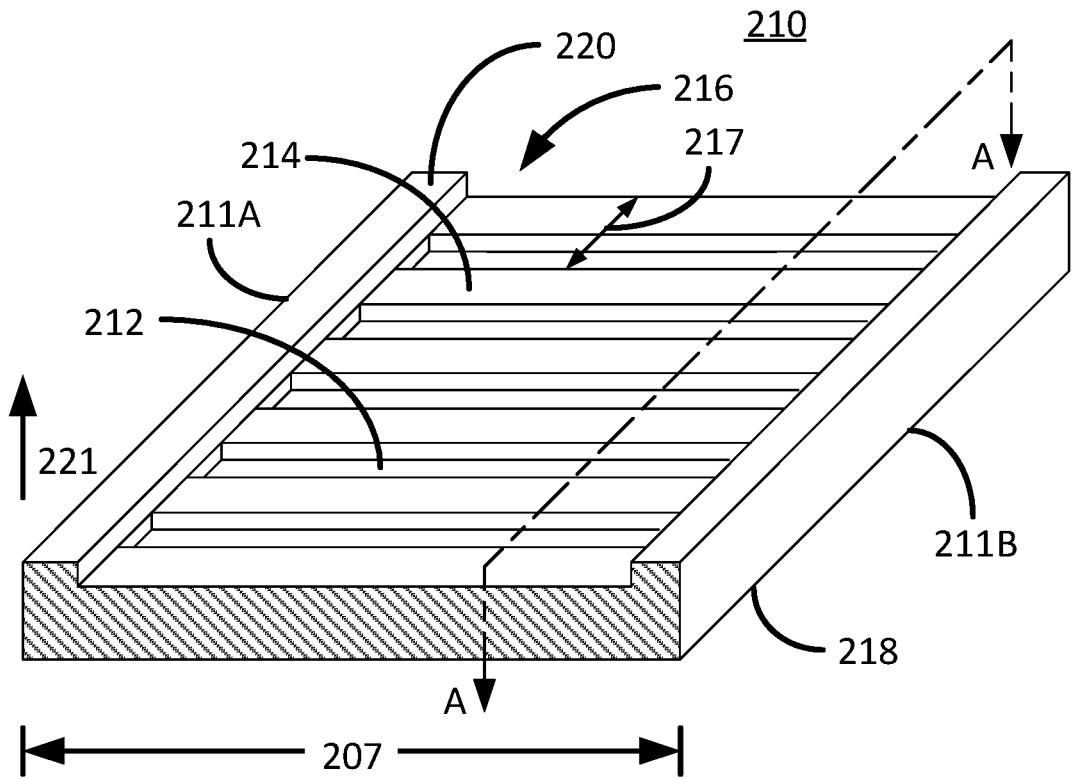
Figure 3C:
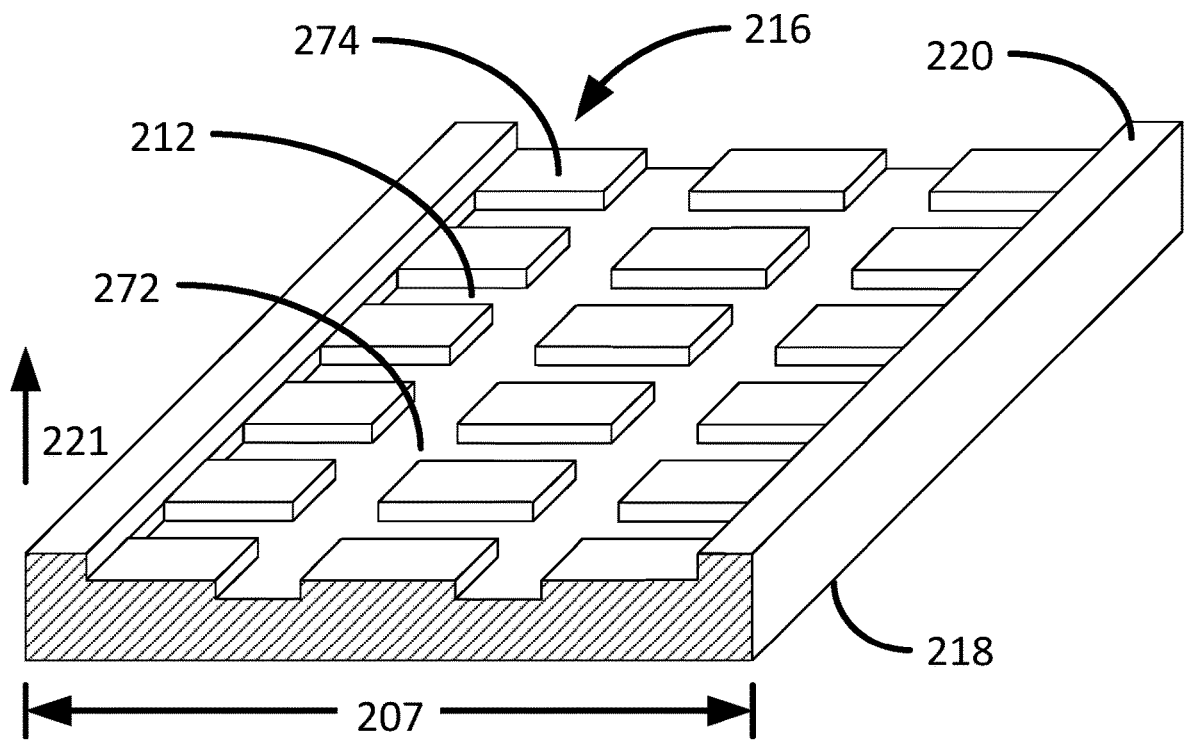

FIG. 2 is a line drawing animation of the hydrocyclone aggregate flowing down the conveyor sluice consistent with embodiments of the present invention. As shown, the hydrocyclone aggregate (which is more or less the conveyor sluice slurry 228) flows down the conveyor sluice distributor pipe 134 where the aggregate 228 is distributed along the width of the distributor 262 and onto the conveyor sluice 200. In other words, the hydrocyclone aggregate 228 is spread out over the belt width 206. In the present embodiment, the conveyor sluice 200 comprises two conveyor sluices 200A and 200B. Each of the conveyor sluices 200A and 200B are generically identified herein as the sluice 200. The conveyor sluice 200 essentially comprises a belt 210 that is wrapped around and in tension (stretched) between a head pulley roller 204 and a tail pulley roller 202, as shown. Certain embodiments imagine the belt 210 being tight but not stretched. The belt 210 is defined by a textured outer surface 216 and a non-textured inner surface 218, as shown in FIGS. 3A-3C. Here, the textured outer surface 216 is essentially exposed to the outer environment 136. A belt motor 238 drives the belt 210 so that at any given time the textured outer surface 216 is either sky-facing 252 (belt surface facing the sky—upward 233), ground-facing 254 (belt surface facing the ground—downward 234) or in transition 256 on the rollers 202 and 204, respectively. Though the belt motor 238 is shown driving the head pulley roller 204, optional embodiments envision a tail pulley roller motor 225 that drives the tail pulley roller 202. Yet other embodiments envision both a head pulley motor 238 and a tail pulley motor 225 working together. To provide context to FIG. 2, the conveyor sluice 200 depicts the textured belt surface 216 having a sky-facing portion 252, a ground-facing portion 254, a lower in-transition portion 256 and an upper in-transition portion (not shown). The belt motor 238, 225 or both, moves the sky-facing portion 252 towards the head pulley roller 204 as shown by arrow 226. Accordingly, the ground-facing portion 254 of the belt moves towards the tail pulley roller 202.

In operation, the heavier undersized aggregate from the hydrocyclone 115 (in the conveyor sluice distributor tank 114) is dispersed via the conveyor sluice slurry distributor 262 at or near the conveyor leading edge 242, as shown. The conveyor leading edge 242 is defined approximately where the head pulley roller 204 is located on the conveyor sluice 200 and the conveyor trailing edge 240 is defined approximately where the tail pulley roller 202 is located. Certain embodiments envision the conveyor sluice slurry distributor 262 dispensing the post hydrocyclone aggregate within 12 inches of the conveyor leading edge 242 on the sky-facing portion of the conveyor belt 252 of the textured outer surface 216. Certain embodiments envision the post hydrocyclone aggregate mixed with water to create conveyor sluice slurry 228, while other embodiments envision the post hydrocyclone aggregate already containing sufficient water from the hydrocyclone 115, which essentially makes up the conveyor sluice slurry 228.

As shown in this embodiment, the conveyor sluice slurry 228 is spread evenly across the belt width 207 (shown in FIG. 3B), which flows downhill (towards the ground 234) counter to the belt movement 226. Specifically, the textured outer surface 216 of the belt 210 retains and thereby separates the heavier grains 300 (see FIG. 4A) in the conveyor sluice slurry 228 from the lighter grains in the post conveyor sluice slurry 229. The heavier grains 300 of conveyor sluice slurry 228 are referred to herein as heavy concentrated aggregate 300. The lighter post conveyor sluice slurry 229 flows off the conveyor trailing edge 240 and into the tails trough 208 (the curved arrows 229 represents the lighter post conveyor sluice slurry). The amount of heavy concentrated aggregate 300 retained in the belt texture 216 is a function of the belt speed and the conveyor sluice angle α 235. The conveyor sluice angle α 235 is defined by the angular drop (negative angle) of the sky-facing belt portion 252 between the head pulley roller 204 and the tail pulley roller 202 referenced against the horizontal plane 230. The negative angle is based on the head pulley roller 204 being above the tail pulley roller 202 causing gravitational flow of the conveyor sluice slurry 228 towards the conveyor trailing edge 240, i.e. 'downhill' flow. Accordingly, a slower belt speed 226 and a lower conveyor sluice angle α 235 may enhance capturing more of the heavy concentrated aggregate 300 trapped in the texture 216, but may also increase the amount of lighter conveyor sluice slurry also retained on the textured outer surface 216. With this in mind, an operator may determine, through trial and error, a preferred conveyor sluice angle α 235 and conveyor belt speed 226. Certain embodiments envision an adjustable conveyor sluice angle α 235 being adjustable by motors or hand cranks, for example. Certain embodiments further envision an adjustable conveyor sluice speed 226 controlled by the belt motor 238.

Figure 4A:
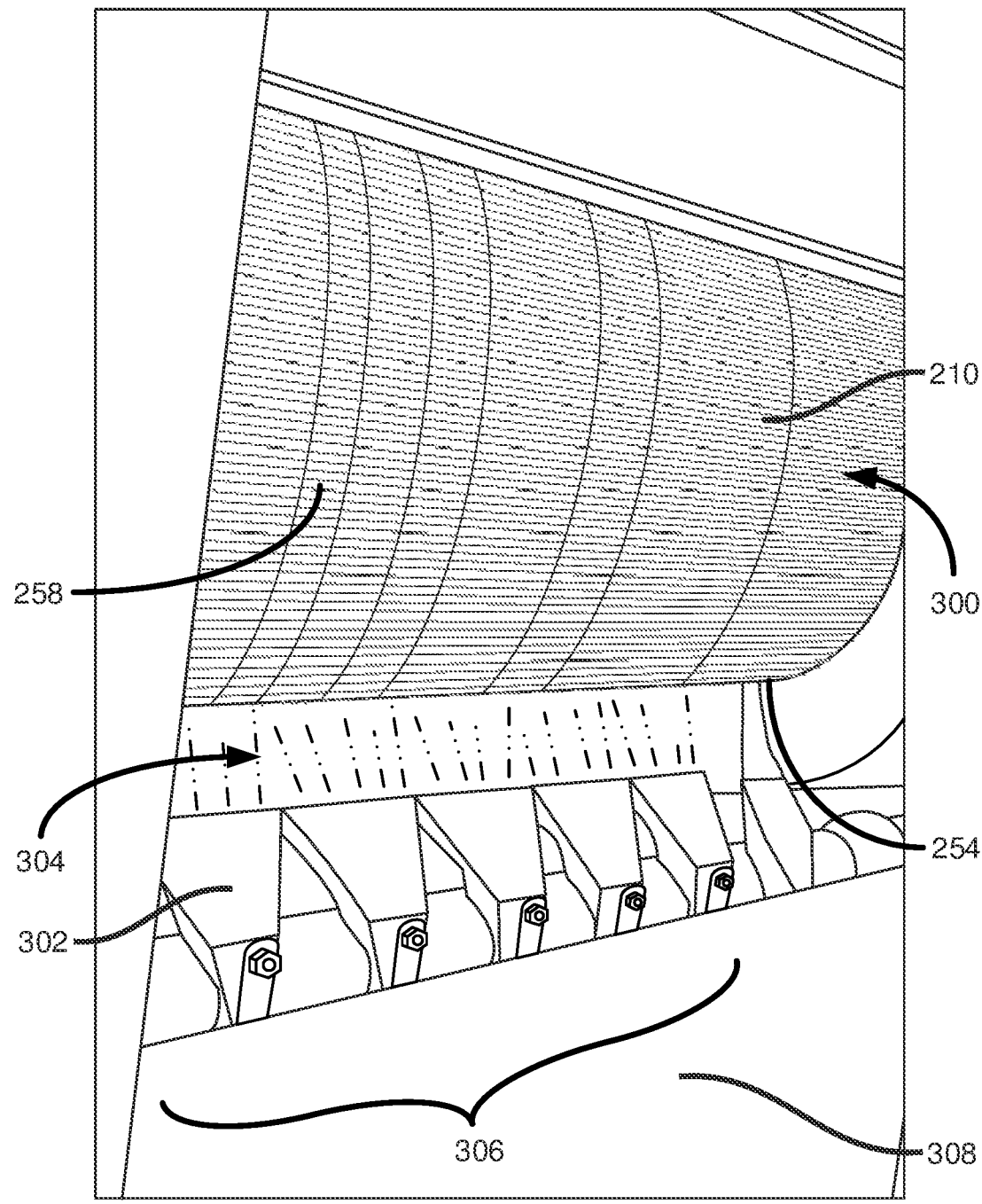
FIG. 4A is a line drawing of the upper in transition portion and belt cleaning rents system consistent with embodiments of the present invention.

As the sky-facing portion 252 of the conveyor belt 210 moves (is rotated) 226 towards the conveyor sluice leading edge 242, the heavy concentrated aggregate 300 that is retained/trapped in the belt texture 216 is carried under the conveyor sluice slurry distributor 262 and over the upper in-transition portion 258 defined by the belt 21 going over the head pulley roller 204, as shown in FIG. 4A. FIG. 4A is line drawing illustrating the upper in-transition portion 258 and belt cleaning rinse system 306 consistent with embodiments of the present invention. As the textured outer surface 216 of the belt 210 rolls over the head pulley roller 204, the horizontal grooves 212 (see FIGS. 3A and 3B) that comprise the textured outer surface 216 spreads apart or otherwise opens up due to the geometrically changing angle over the circular roller 204. The spread apart grooves 212 makes it easier for the belt cleaning rinse water 304 to free/liberate (i.e., rinse off) the heavy concentrated aggregate 300 trapped inside of the belt texture 212. The belt cleaning rinse water 304 is directed or sprayed by the plurality of belt cleaning rinse nozzles 302 at the spread apart belt texture 212 along the upper in-transition portion 258 near or at where the textured outer surface 216 transitions to the ground-facing portion 254. The heavy concentrated aggregate 300 and rinse water 304 drips/pours from the textured outer surface 206 into a concentrate launder 308 (essentially a tank). The collected heavy concentrated aggregate 300 and rinse water 304 is pumped from the concentrate launder 308 via the concentrate pump 244 (of FIG. 2B) to the concentrate hopper 130 via the concentrate to hopper pipeline 132 (of FIG. 1B). The concentrate hopper 130 is essentially a decanting hopper with excess rinse water 304 overflowing from the top of the concentrate hopper 130. The heavy concentrated aggregate 300 in the concentrate hopper 130 flows out the concentrate hopper bottom 131 down a finishing table conduit 140 to a finishing table 350 (of FIG. 4D). Some embodiments use a metering system (not shown) to control the feed rate of concentrated aggregate 300 from the feed hopper 130 to the finishing table 350. A metering system can optionally be used to assure a consistent feed from the concentrate hopper 130 to the finishing table 350. Still, some other embodiments use the metering system to facilitate gravity flow of the heavy concentrated aggregate 300 from the concentrate hopper 130 to the finishing table 350. It is further imagined that a metering system can be used to pump the decanted heavy concentrate 300 uphill to the finishing table 350.

In certain embodiments, the conveyor sluice slurry 228 moves down the textured outer surface 216 towards the conveyor sluice trailing edge 240 essentially in a laminar flow stream. 'Essentially' as applied to the laminar flow herein is envisioned as the flow stream of the conveyor sluice slurry 228 possibly having small amounts of turbulence including micro-turbulent eddies at the boundary layer of the textured outer surface 216. Laminar flow, and in some cases moderately turbulent flow has an advantage of producing flow stratification that enhances movement of the heavy concentrated aggregate 300 to the belt texture 212 (of FIGS. 3A and 3B). Certain embodiments further envision the conveyor sluice slurry stream 228 being between 0.125 and 0.5 inches deep. In certain instances, it may be advantageous for the conveyor sluice slurry stream 228 moving down the textured outer surface 216 by way of turbulent flow that is essentially continuously turning the conveyor sluice slurry 228 along the conveyor length 205.

Certain other embodiments of the conveyor sluice of FIG. 2 illustratively depict a particle suppression mister 236 that sprays a fine mist of water over the conveyor sluice width 206, or at least the belt width 207. The suppression mister 236 effectively disrupts the surface tension that suspends platelet like particles on the surface of the conveyor sluice slurry 228. More specifically, some of the small platelet particles of interest (for example sheet-like particles of gold or some other precious metal/material) can become suspended (i.e., float) on top of the conveyor sluice slurry 228 only to be carried away to the tails trough 208 where it is lost. The suppression mister 236 sprays a mist of water 237 on the floating sheet-like particles at least partially covering the floating sheet-like particles with water. This disrupts the surface tension that holds sheet-like particles on the surface, thereby sinking the floating particles into the slurry stream 228. Once the sheet-like particles are in the stream of the conveyor sluice slurry 228 (i.e., no longer floating on the surface), the sheet-like particles have a greater chance of sinking to the bottom of the conveyor sluice slurry stream 228 and getting caught in the belt texture 212.

FIGS. 3A-3C are line drawings of several belt texture embodiments consistent with embodiments of the present invention. FIG. 3A is a cross-sectional view along cut-line A-A of the embodiment of FIG. 3B. As shown, the cross-section view of the belt 210 depicts the textured outer surface 216 having grooves 212 and peaks 214 whereby the non-textured inner surface 218 (the obverse of the textured outer surface 216) is smooth or not intentionally textured. In certain embodiments the grooves 212 are between 0.125-0.385 inches wide 215, however other embodiments envision a different width 215. Some embodiments envision the depth of the grooves 212 (depth between the peak 214 and the bottom of the groove 212) being between 0.125-0.385 inches, however other embodiments envision a different depth. In the present embodiment, the bottom of the grooves 212 are essentially flat surfaced that meet a vertical sidewall extending to the texture peaks 214. However, other shapes, such as U-shaped groove bottoms or V-shaped groove bottoms, can be employed without departing from the scope and spirit of the present invention. Likewise, the texture peaks 214 are not limited to the flat profile in this embodiment but can equally be formed of various shapes. The various shapes can be tailored to encourage minor turbulence causing gentle/subtle mixing within the boundary layer of the stream of the conveyor sluice slurry 228.

FIG. 3B is an isometric line drawing a portion of the belt 210 showing the textured outer surface 216 consistent with embodiments of the present invention. This belt embodiment 210 comprises a plurality of linear grooves 212 that extend from the left belt side 211A to the right belt side 211B at 90° along the belt length 205. This belt embodiment 210 further comprises raised side borders 220 that extend above (see arrow 221) the texture 216. The raised side boarders 220 can be between 0.125-2.0 inches wide and 0.5-4 inches tall (in the direction of arrow 221), just to name several non-limiting dimensions. The raised side boarders 220 can be straight or corrugated, for example. Some embodiments envision the texture 216 and side borders 220 being heat molded into the outer surface of the belt 210 wherein the texture 216 and side borders 220 are not elements attached to the belt surface 216. Certain other embodiments envision the surface texture 216 being an angle between the two belt sides 211A and 211B (i.e., not 90° along the belt length 205). Still other embodiments envision V-shaped grooves, zigzag grooves, arcing grooves, just to name a few without departing from the scope and spirit of the present invention.

FIG. 3C is an isometric line drawing of a portion of the belt 200 showing an alternative texture arrangement consistent with embodiments of the present invention. In this embodiment, the textured outer surface 216 includes grooves 212 that are disrupted by channels 272 running lengthwise with the belt 210. Other embodiments envision randomly ordered raised texture patches 274, which can be rectangular shaped, circular shaped, or some other kind shape. Still, other embodiments envision raised texture patches 274 that are not randomly distributed along the surface of the belt 210.

Figure 4B:
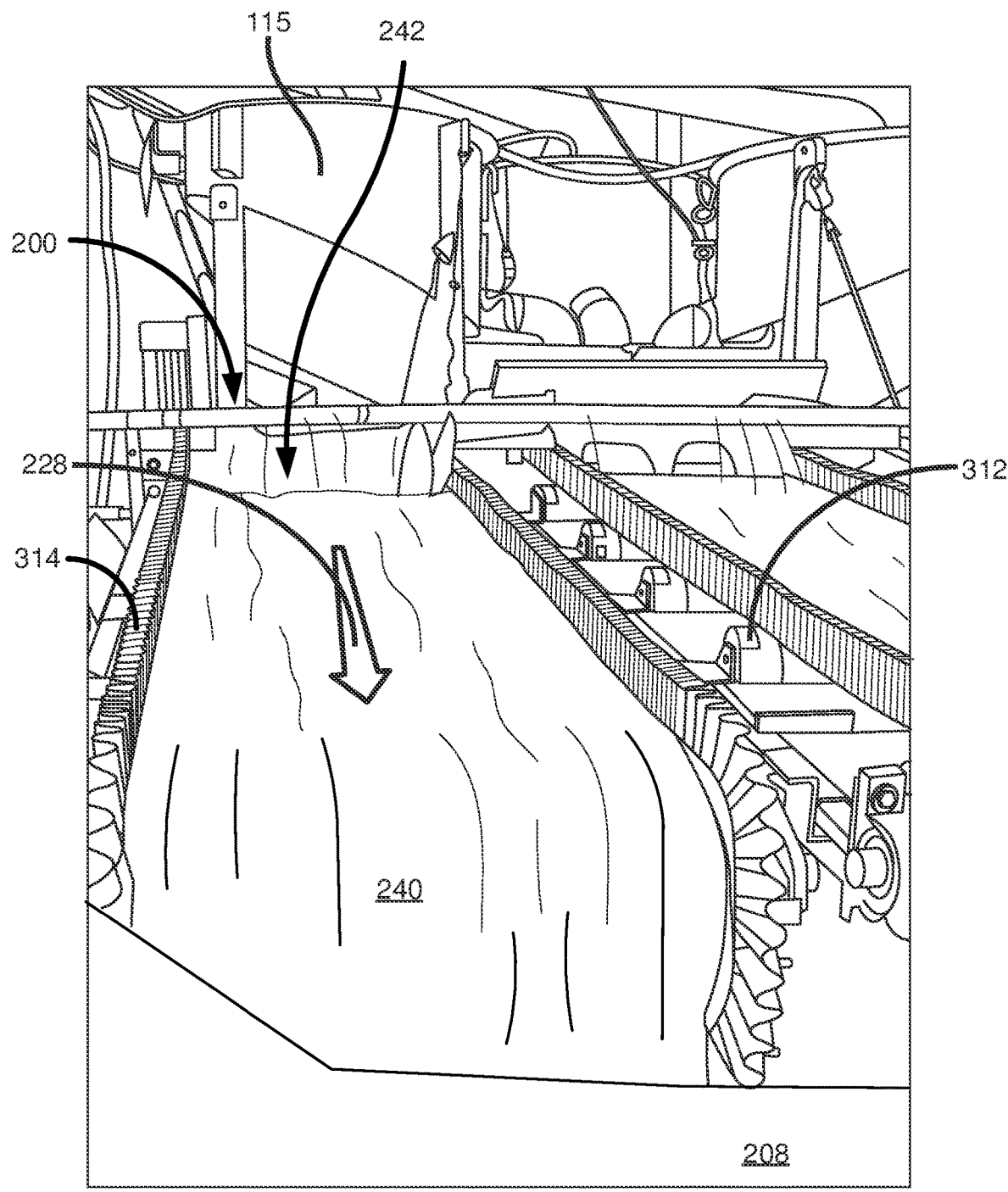
FIG. 4B is a line drawing of side-by-side conveyor sluices with conveyor sluice slurry running down the sky-facing portion of the textured outer surface consistent with embodiments of the present invention.

FIG. 4B is a line drawing that illustratively depicts of side-by-side conveyor sluices 200 with conveyor sluice slurry 228 running down the sky-facing portion 252 of the textured outer surface 216 consistent with embodiments of the present invention. As shown, the conveyor sluice slurry 228 flows from the leading edge 242 over the trailing edge 240. The conveyor sluice slurry 228 is confined on the belt 210 between corrugated belt side rails 314, which channels the conveyor sluice slurry 228 to the tails trough 280. In this embodiment, the corrugated belt side rails 314 are bonded or otherwise affixed to the belt sides 211A and 211B, which keep the solids from the conveyor sluice slurry 228 from getting on the equipment under the belt 210. The belt side rails 314 can be stationary rails that butt up/interface against the belt sides 211A and 211B with the proper sealing at the interface known to those skilled in the art. Being corrugated, the belt side rails 314 can flex as the belt moves over the head pulley roller 204 and a tail pulley roller 202. The corrugated belt side rails 314 can be affixed to the belt sides 211A and 211B via a bonding agent, such as glue, or by way of a mechanical bracket, or other manner known to those skilled in the mechanical arts. In the present embodiment, the sluice length 205 is between 10-14 ft. For longer belts/conveyor lengths 205, the belt 210 is supported by four belt supports 312, which in this embodiment are belt support rollers. Certain configurations envision one or more of the belt support rollers 312 being motorized to vibrate vertically between 0-400 Hz. In certain instances, the vibration improves settling of the concentrated aggregate 300 in the texture grooves 212.

Figure 4C:
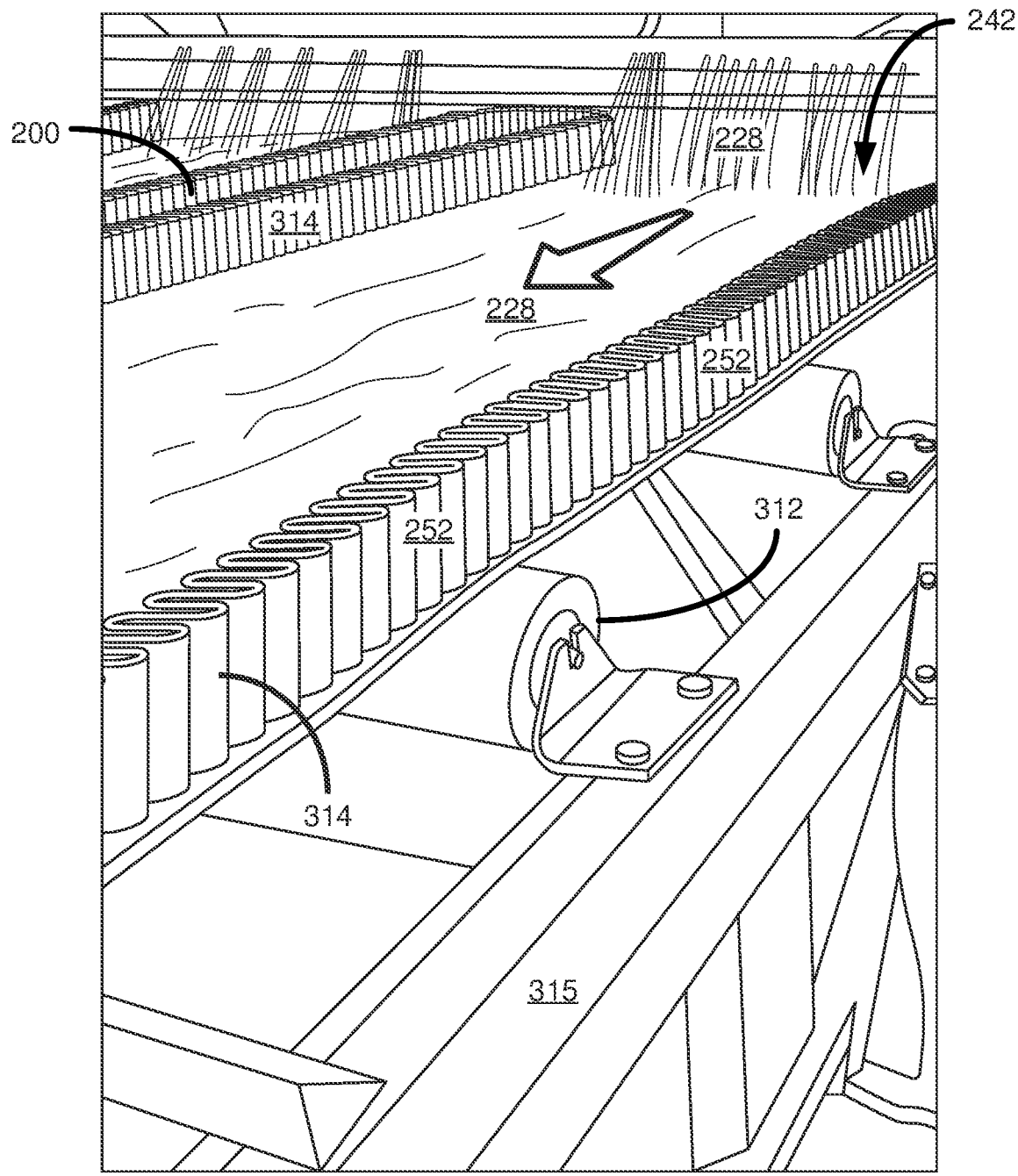
FIG. 4C is a line drawing of a different angle of the side-by-side conveyor sluices of FIG. 4B.

FIG. 4C is a line drawing of a different angle of the side-by-side conveyor sluices 200 of FIG. 4B. As shown here, the conveyor sluice 200 is supported a frame 315 that also supports the belt support rollers 312. Two of the belt support rollers 312 show how they hold up the sky-facing belt portion 252. Also, shown is the conveyor sluice slurry 228 flowing from the conveyor sluice leading edge 242 towards the conveyor sluice trailing edge 240 (the conveyor sluice trailing edge 240 is not shown in FIG. 4C). This photograph further shows a different angle of the belt side rails 314 containing, or channeling, the flow of the conveyor sluice slurry 228 over the belt 210.

Figure 4D:
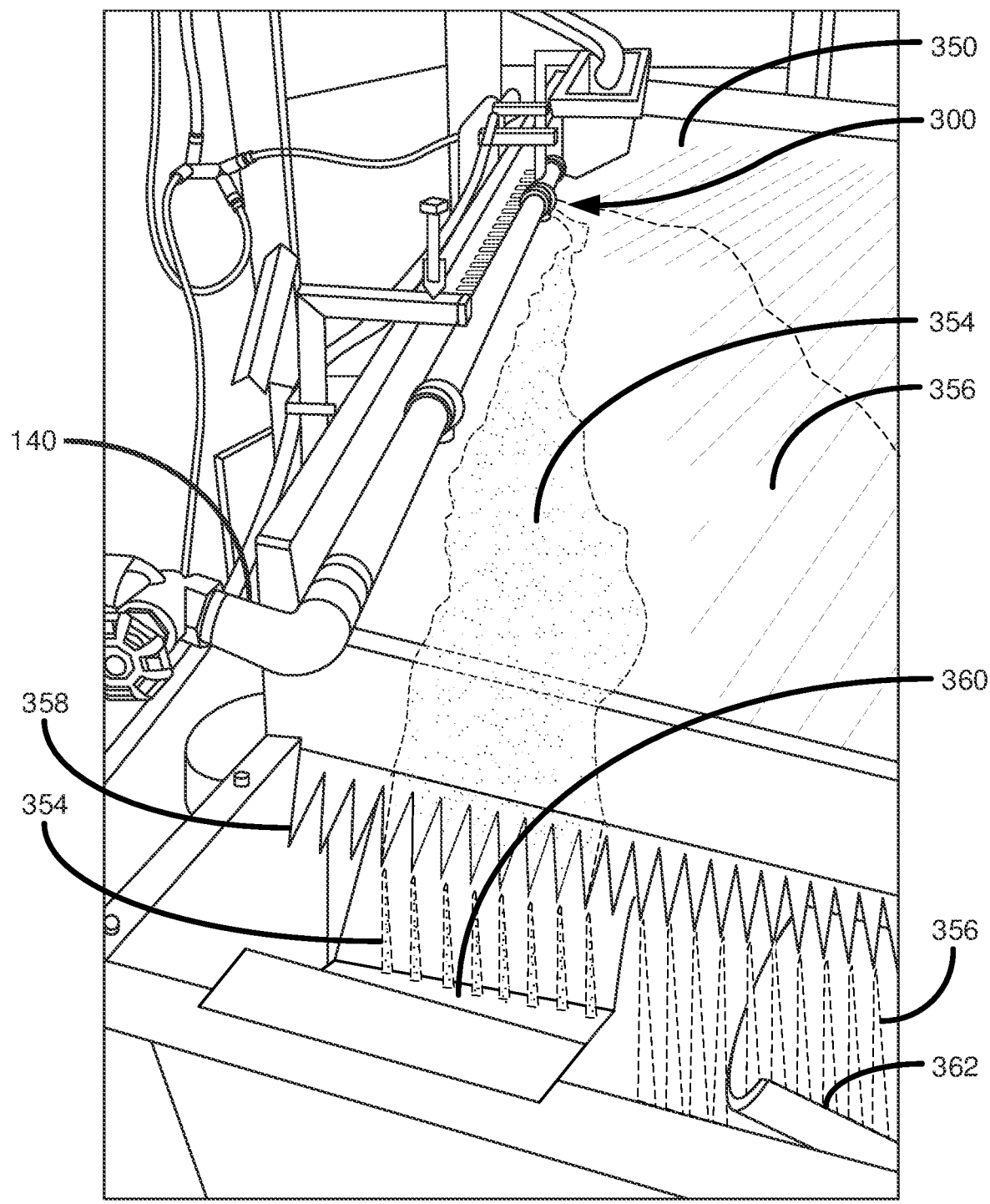
FIG. 4D is a line drawing of a finishing table separating concentrated aggregate.

FIG. 4D is a line drawing of the finishing table 350 receiving the concentrated aggregate 300 from the concentrate hopper 130 (FIG. 1B) via the finishing table conduit 140. The finishing table 350 vibrates horizontally as well as vertically separating out the very fine heavy target material 354 (such as gold dust) from the incoming concentrated aggregate 300. The fine target material 354 drips down drip channels 358 into a collecting trough 360 and the fine discard material 356 drips down the drip channels 358 into the discard tails trough 362. Some of the fine discard material 356 simply drips off the end of the finishing table 350 as discard tails.

Figure 5:
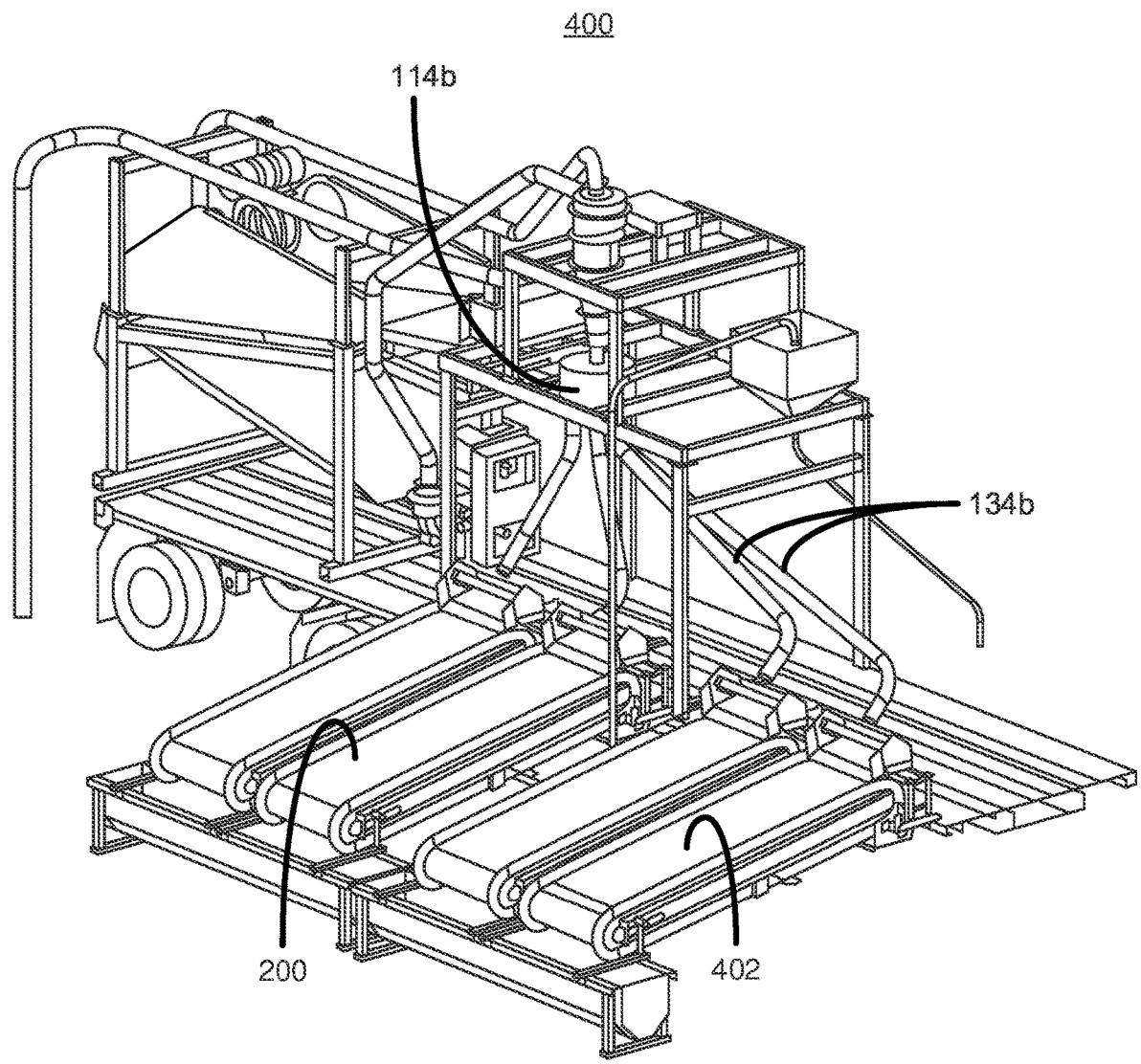
FIG. 5 is a line drawing of yet another embodiment of a conveyor sluice system consistent with embodiments of the present invention.

FIG. 5 is a line drawing of yet another embodiment of a conveyor sluice system consistent with embodiments of the present invention. This conveyor sluice system embodiment 400 is more or less identical to the setup of the conveyor sluice system 100, of FIG. 1B, except that the conveyor sluice system embodiment 400 comprises two conveyor sluices 200 and 402. Also, the conveyor sluice distributor tank 114b (which is a subtle alteration from the tank 114 in FIG. 1B) feeds four conveyor sluices 200 and 402 with the appropriate conveyor sluice distributor pathways 134b (which is a subtle alteration from the pathways 134 in FIG. 1B), as shown. A skilled artisan will appreciate that additional conveyor sluices 200 and 402 (or more) increases speed and throughput of the operation.

With the present description in mind, below are some examples of certain embodiments illustratively complementing some of the methods and apparatus embodiments to aid the reader. The elements called out below in view of the various figures are examples provided to assist in understanding the present invention and accordingly should not be considered limiting.

In that light, as depicted in FIGS. 1A, 1B and 2, certain embodiment contemplate a mineral recovery system 100 comprising: a static riffle sluice 105 defined by a riffle sluice leading edge 122 and a riffle sluice trailing edge 124, the static riffle sluice 105 configured to receive a raw feed slurry 112 from a grizzly hopper (not shown). An aggregate screen 110, disposed after the riffle sluice trailing edge 124, essentially permits only screened undersized aggregate (not shown) from the raw feed slurry 112 to pass to an undersized aggregate collecting tank 120. A static hydrocyclone 115 is configured to receive the screened undersized aggregate (not shown). The mineral recovery system further comprising at least one conveyor sluice 200 having a textured belt 210 that wraps around a head pulley roller 204 and a tail pulley roller 202, the head pulley roller 204 is positioned higher than the tail pulley roller 202. By 'positioned higher', it is meant that the head pulley roller 204 is vertically above the tail pulley roller 202, the head pulley roller 204 extending in the direction of the arrow 233 of FIG. 2 relative to the tail pulley roller 202. The textured belt 210 is configured to rotate with a sky-facing belt portion 252 moving towards (arrow 226) the head pulley roller 204 and a ground-facing belt portion 254 moving towards the tail pulley roller 202. Post hydrocyclone aggregate (not shown) is received from the static hydrocyclone 115, which is configured to be distributed on the sky-facing surface 252 of the belt 210 within 12 inches of the head pulley roller 204. The textured belt 210 is configured to retain, or otherwise trap, a concentrated aggregate 300 from the post hydrocyclone aggregate. At least one belt cleaning rinse nozzle 302 is directed at the textured belt 210 within 12 inches of the head pulley roller 204 but not directed at the sky-facing belt surface 252. This is envisioned to be at the upper belt in-transition portion 258 or the ground facing belt surface 254 closer to the upper belt in-transition portion 258 than the lower belt in-transition portion 256. The belt cleaning rinse nozzle 302 is configured to spray rinse water 304 on the textured belt 210 to liberate the concentrated aggregate 300 from the textured belt 210. A finishing table 350 configured to receive the liberated concentrated aggregate 402 and separate fine target material 354 from the concentrated aggregate 300.

The mineral recovery system embodiment 100 further envisioning the stationary riffle sluice 105 residing at a riffle sluice angle α 235 between −5° and −45° from a horizontal reference plane 230.

The mineral recovery system embodiment 100 further imagining wherein the static hydrocyclone 115 is further configured to receive water (not shown) with the screened undersized aggregate (not shown).

The mineral recovery system embodiment 100 further pondering the conveyor sluice 200 having a conveyor sluice angle α 235, defined along the sky-facing belt surface 252 from the head pulley roller 204 to the tail pulley roller 202, being between −5° and −45° from the horizontal plane 230.

The mineral recovery system embodiment 100 wherein the aggregate screen 110 blocks essentially all course aggregate (not shown) that is larger than ⅛ of an inch from the feed slurry 112.

The mineral recovery system embodiment 100 further comprising an undersized aggregate pump 126 disposed between the riffle sluice tank 120 and the hydrocyclone 115, the undersized aggregate pump 126 configured to move the screened undersized aggregate (not shown) to the hydrocyclone 115.

The mineral recovery system embodiment 100 further comprising a conveyor sluice distribution pathway 134 that channels the post hydrocyclone aggregate (not shown) from the hydrocyclone 115 to the textured belt 210.

The mineral recovery system embodiment 100 further comprising at least one laminar flow water nozzle 310 configured to direct conveyor sluice slurry 228 at the sky-facing belt surface 252 within 12 inches of the head pulley roller 204. A reject material trough 208 can be located vertically below the tail pulley roller 202 (in the direction of the arrow 234 of FIG. 2. The reject material trough 208 is configured to collect a proportion of the conveyor sluice slurry 228 that is not collected in the belt texture 212.

The mineral recovery system embodiment 100 further comprising a concentrate launder 308 configured to collect the concentrated aggregate 300 and the rinse water 304. This embodiment can further comprise a slurry/concentrate pump (not shown) that pumps the concentrated aggregate 300 and the rinse water 304 into a decanting hopper 130 that is above the concentrate launder 308 (again in the vertical direction defined by the arrow 233 of FIG. 2). Optionally, this embodiment can further be where a percentage of the rinse water 304 and the concentrated aggregate 300 flow by way of gravity (meaning by way of the gravitation force of the Earth's gravitational field) from the decanting hopper 130 to the finishing table 400.

The mineral recovery system embodiment 100 further envisioned to comprise a primary scalping screen (not shown) that filters or otherwise scalps large raw aggregate (not shown) from the feed slurry 112 prior to the feed slurry 112 reaching the stationary riffle sluice 105.

Yet another embodiment contemplates a conveyor sluice embodiment 200 comprising a belt 210 defined by a textured outer surface 216 wherein the belt 210 is wrapped around a head pulley roller 204 and a tail pulley roller 202. At any given time, the textured outer surface 216 comprises a sky-facing portion 252, a ground-facing portion 254 or an upper in-transition portion 258 while the belt 210 is cooperating with the pulley rollers 202 and 204. The conveyor sluice 200 defines a sluice length 205 as extending from the head pulley roller 204 to the tail pulley roller 202 and a conveyor sluice width 206 defined as greater than or equal to a belt width 207 of the belt 210. The conveyor sluice is at an angle 235 that is between −5° and −45° from a horizontal plane 230, the conveyor sluice angle 235 defined by the sky-facing portion 252 between the head pulley roller 204 and the tail pulley roller 202. The head pulley roller 204 is above the tail pulley roller 202. A post hydrocyclone aggregate distributor 134 feeds conveyor sluice slurry 228 onto the sky-facing portion 252 within 12 inches of the head pulley roller 204. At least one belt cleaning rinse nozzle 302 (with rinse water 304) is directed at the textured outer surface 216 either at the upper in-transition portion 258 at the head pulley roller 204 or at the ground-facing portion 254. A concentrate launder 308 is located under the ground-facing portion 254. A concentrate pump 244 is in communication with the concentrate launder 308 and a concentrate hopper 130. A belt motor 238 configured to drive the sky-facing portion 252 only towards the head pulley roller 204 at a velocity 226, which in certain embodiments is adjustable. Some embodiments contemplate the velocity 226 being between 1-30 feet per minute.

The conveyor sluice embodiment 200 further contemplating wherein the sluice length 205 is longer than 6 feet.

The conveyor sluice embodiment 200 further envisioning wherein the head pulley roller 204 has a diameter that is between 3-16 inches and a length that at least spans a belt width 207.

The conveyor sluice embodiment 200 further imagining wherein the belt width 207 is at least 15 inches wide.

The conveyor sluice embodiment 200 further pondering wherein a substantial portion of the textured outer surface 216 is essentially always exposed to the outside environment 136. By substantial, it is meant and defined as more than 75% of the textured outer surface 216 is always exposed to the outside environment 136.

The conveyor sluice embodiment 200 further considering wherein the belt 210 is in tension caused by the head pulley roller 204 and the tail pulley roller 202.

The conveyor sluice embodiment 200 wherein the belt motor 238 drives at least one of the pulleys 202 and 204. The belt motor 238 drives the belt 210, which in certain embodiments can be adjusted to alter a rotational speed whereby an end user can select a 'mass pull' from 0 up to 40%. 'Mass pull' is defined as the amount of concentrated aggregate 300 that is trapped in the belt texture 216.

The conveyor sluice embodiment 200 further comprising a reject material trough residing below the tail pulley roller.

The conveyor sluice embodiment 200 wherein the belt 210 comprises raised side borders 220 that are located on either side of the belt 210, the raised side borders 220 extend outwardly 221 from the belt 210 further than the textured outer surface 216. The raised boarders 220 confine the fine material (from the conveyor sluice slurry 228) to be trapped in the belt texture 212.

The conveyor sluice embodiment 200 further comprising at least one particle suppression mister 236 that is aimed at the sky-facing portion 252, the mister 236 comprising a target area that is completely across the belt width 207 and at least partially along the sluice length 205.

The conveyor sluice embodiment 200 further comprising a slurry distributor 262 approximately at an interface defined where the head pulley roller 204 meets the belt 210.

The conveyor sluice embodiment 200 further comprising a belt vibration generator 264 that generates amplitude waves at between 1-400 Hz. The belt vibration generator 264 can optionally contact the belt 210 at the ground-facing portion 254 translating the belt vibration to the sky-facing portion 252.

The conveyor sluice embodiment 200 further envisioning wherein the vibration is adjustable via a sweep frequency. The vibration amplitude can be between 0.1-2.0 Gs. A g-force is a measure of acceleration known as the force of gravity. 1G is the acceleration of gravity generally has a value of 9.806 m/s$^2$ or 32.1740 f/s$^2$.

The conveyor sluice embodiment 200 further comprising a belt side rail 214 that is on either side of the belt sky-facing portion 252, which extends at least 0.75 inches from the textured outer surface 216. The belt side rails 214 confine the conveyor sluice slurry 228 to flow over the sky facing belt surface 252 and ultimately channeling the slurry stream 228

(i.e., the portion of the slurry 228 not trapped by the belt texture 212) into the reject material trough 208.

The conveyor sluice embodiment 200 further pondering the textured outer surface 216 comprising a pattern of 0.15-inch grooves 212 with 0.25-inch periods.

The conveyor sluice embodiment 200 further considering the conveyor sluice angle 235 being adjustable. Optional embodiments contemplate the conveyor sluice 200 being alongside a second conveyor sluice 200B that is essentially identical to the conveyor sluice 200 but is adjusted at a different conveyor sluice angle 235. In other words, a first conveyor sluice 200A is at a different angle than a second conveyor sluice 200B, as shown in FIG. 2.

Still other embodiments contemplate a method for segregating conveyor sluice slurry 228 comprising providing a conveyor sluice 200 that comprises a textured belt 210 wrapped around a head pulley roller 204 and tail pulley roller 202. The belt 210 defining a textured outer surface 216 that when facing upward 221 is considered a sky-facing belt surface 252 and when facing downward is considered a ground-facing belt surface 254. The conveyor sluice can be positioned at a conveyor sluice angle 235 between −5° and −45° from a horizontal plane 230. Conveyor sluice slurry 228 can be introduced to the sky-facing belt surface 252 approximately at the head pulley roller 204. The sky-facing belt surface 252 can be made to essentially continuously move towards the head pulley roller 204 while continuously flowing the conveyor sluice slurry 228 towards the tail pulley roller 202. While the sky-facing belt surface 252 is essentially continuously moving towards the head pulley roller 204, a concentrated aggregate 300 is separated out from the conveyor sluice slurry 228. The concentrated aggregate 300 settles in grooves 212 in the textured outer surface 216. While the sky-facing belt surface 252 is essentially continuously moving towards the head pulley roller 204, the textured outer surface 216 is rotated over the head pulley roller 204. The concentrated aggregate 300 is then sprayed off of the textured belt surface 216, or more specifically, out from the grooves 212 with rinse water 304 (of FIG. 4A) at the head pulley roller 204 and/or the ground-facing surface 254. The rinse water 304 and the sprayed off concentrated aggregate 300 is collected in a concentrate launder 308 where the concentrated aggregate 300 along with the rinse water 304 is pumped (via a pump 244) from the concentrate launder 308 to a decanting hopper 130. The concentrated aggregate 300 and at least a portion of the rinse water 304 in the decanting hopper 130 is emptied to a finishing table 350. This can be a continuous process whereby the finishing table 350 constantly receives concentrated aggregate 300 along with rinse water 304 from the decanting hopper 130. Accordingly, the decanting hopper 130 constantly receives the concentrated aggregate 300 along with the rinse water 304 from the concentrate launder 308, which receives a continuous supply of concentrated aggregate 300 from the constantly moving belt 210.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, computer systems and controllers can be used to control the speed of the conveyor belt motors, the conveyor belt angles, the pumping rates in different locations in the system 100, etc., while keeping in sync with the scope and spirit of the present invention. Another example envisions the belt texture including any number of different stages, going from one texture arrangement to a different texture arrangement in different locations on the belt whether lengthwise or widthwise to potentially enhance functionality without departing from the scope and spirit of the present invention. Further, the term "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and defined in the appended claims.

What is claimed is:

1. A conveyor sluice comprising:
 a belt having a belt width that is defined between a first belt side and a second belt side, the belt comprising a textured outer surface and a first flexible rail extending essentially orthogonally away from the textured outer surface at the first belt side and a second flexible rail at the second belt side that is essentially parallel to the first flexible rail,
 the belt is partially wrapped around a head pulley roller and a tail pulley roller,
 at any given time, the textured outer surface comprises a sky facing portion, a ground facing portion or an upper in-transition portion while the belt is cooperating with the pulley rollers, the sky facing portion contains more heavy concentrated aggregate trapped in the textured outer surface than the ground facing portion, the heavy concentrated aggregate is from conveyor sluice slurry solids;
 the conveyor sluice defines a sluice length as extending from the head pulley roller to the tail pulley roller and a conveyor sluice width defined as greater than or equal to the belt width;
 a conveyor sluice angle that is between −5° and −45° from a horizontal plane, the conveyor sluice angle is defined by the sky facing portion between the head pulley roller and the tail pulley roller, the head pulley roller is above the tail pulley roller;
 a post hydrocyclone aggregate distributor is configured to feed conveyor sluice slurry containing the heavy concentrated aggregate onto the sky facing portion within 12 inches of the head pulley roller, wherein the first and the second flexible rails are corrugated and are configured to confine the feed conveyor sluice slurry to the sky facing portion of the belt;
 at least one belt cleaning rinse nozzle directed at the textured outer surface either at the upper in-transition portion at the head pulley roller or at the ground facing portion;
 a concentrate launder located under the ground facing portion;
 a concentrate pump in communication with the concentrate launder and a concentrate hopper; and a belt motor configured to drive the sky facing portion only towards the head pulley roller at a velocity.

2. The conveyor sluice of claim 1, wherein a substantial portion of the textured outer surface is essentially always exposed to the outside environment.

3. The conveyor sluice of claim 1, wherein a belt motor is configured to drive the belt to a rotational speed wherein an end user can select a 'mass pull' from 0 up to 40%.

4. The conveyor sluice of claim 1 further comprising at least one particle suppression mister aimed at the sky facing portion, the mister comprising a target area that is completely across the belt width and at least partially along the sluice length.

5. The conveyor sluice of claim 1 further comprising a laminar flow water spreader approximately at an interface defined where the head pulley roller meets the belt.

6. The conveyor sluice of claim 1 further comprising a belt vibration generator that generates amplitude waves at between 1-400 Hz.

7. The conveyor sluice of claim 1, wherein the first flexible rail is bonded essentially at the first belt side and the second flexible rail is bonded essentially at the second belt side.

8. The conveyor sluice of claim 1 further comprising a reject material trough below the tail pulley roller.

9. The conveyor sluice of claim 1, wherein the belt vibration generator contacts the belt at the ground facing portion, the belt vibration generator configured to translate vibrations to the sky facing portion of the belt.

10. The conveyor sluice of claim 1, wherein the vibration is a sweep vibration.

11. The conveyor sluice of claim 1, wherein the vibration is between 0.1 G and 2 G's.

12. The conveyor sluice of claim 1, wherein the first flexible rail and the second flexible rail located on either of the sides of the belt sky facing portion extends at least 0.75 inches from the textured outer surface.

13. The conveyor sluice of claim 1, wherein the textured outer surface comprises a pattern of 0.125-0.385-inch grooves with 0.25-inch periods.

14. The conveyor sluice of claim 1, wherein the conveyor sluice consists of the textured outer surface and the first and the second flexible rails.

15. A conveyor sluice comprising:
a belt wrapped over a head pully roller and a tail pully roller, the head pulley roller above the tail pulley roller,
the belt defined by a textured outer surface that spans between belt sides, a flexible corrugated siderail that extends essentially orthogonally from each of the belt sides, the textured outer surface includes a sky facing belt surface, a ground facing belt surface, and a head transition semi-circular belt surface at the head pully roller and a tail transition semi-circular belt surface at the tail pully roller;
heavy concentrated aggregate configured to be trapped in the textured outer surface of the sky facing belt surface and at least a portion of the head transition semi-circular belt surface but at least a portion of the textured outer surface of the ground facing belt surface is essentially devoid of the heavy concentrated aggregate, the heavy concentrated aggregate is from conveyor sluice slurry;
a distributor is configured to dispense the conveyor sluice slurry onto the sky facing belt surface within 12 inches of the head pulley roller, wherein the conveyor sluice slurry is confined to the sky facing belt surface between the flexible corrugated siderails;
at least one belt cleaning rinse nozzle directed at the textured outer surface either at the head transition semi-circular belt surface or at the ground facing belt surface;
a concentrate launder located under the ground facing portion; and
a belt motor configured to move the sky facing portion only towards the head pulley roller.

16. The conveyor sluice of claim 15, further comprising a conveyor sluice angle that is between −5° and −45° from a horizontal plane, the conveyor sluice angle defined by the sky facing belt surface between the head pulley roller and the tail pulley roller.

17. The conveyor sluice of claim 15 further comprising a belt vibration generator that generates amplitude waves at between 1-400 Hz.

18. A conveyor sluice comprising:
a belt wrapped over a head pully roller and a tail pully roller, the head pulley roller above the tail pulley roller, which defines a sky facing belt surface, a ground facing belt surface, and a head transition semi-circular belt surface at the head pully roller and a tail transition semi-circular belt surface at the tail pully roller;
the belt having a textured outer surface that is between a pair of flexible siderails that are integrated with the belt, wherein the flexible siderails are corrugated and are configured to comply with the head and the tail pully rollers as the flexible siderails move with the belt over the head and the tail pully rollers;
at least one belt cleaning rinse nozzle directed at the textured outer surface either at the head transition semi-circular belt surface or at the ground facing belt surface;
the sky facing belt surface is configured to contain more heavy concentrated aggregate trapped in the textured outer surface than the ground facing belt surface, the heavy concentrated aggregate is from conveyor sluice slurry;
a distributor configured to dispense the conveyor sluice slurry onto the sky facing belt surface within 12 inches of the head pulley roller; and
a belt motor configured to move the sky facing portion only towards the head pulley roller.

* * * * *